United States Patent Office 3,446,854
Patented May 27, 1969

3,446,854
PROCESS FOR THE PRODUCTION OF
PARAFORMALDEHYDE
William G. Hughes, Plainfield, and Samuel Weiss, River
Edge, N.J., and John Lambiris, New York, N.Y., assignors to Tenneco Chemicals, Inc., a corporation of
Delaware
No Drawing. Filed Feb. 1, 1967, Ser. No. 613,108
Int. Cl. C07c 47/10
U.S. Cl. 260—615.5                         10 Claims

ABSTRACT OF THE DISCLOSURE

Paraformaldehyde of controlled molecular weight is prepared by flash-evaporating a deionized aqueous formaldehyde solution in a plurality of stages that are separated by and followed by polymerization periods. In a two-stage concentration, each of the evaporation steps is carried out in 2 to 120 seconds at 140° C. to 180° C. under reduced pressure. The 60 to 75 percent formaldehyde solution obtained from the first evaporation is polymerized at 60° C. to 90° C. for 30 to 120 minutes. The 82 to 88 percent formaldehyde solution obtained from the second evaporation is polymerized at 100° C. to 140° C. for 1.5 to 4 hours. After it has been cooled and solidified, the product may be dried to raise its paraformaldehyde content to 90 to 95 percent.

---

This invention relates to a process for the production of paraformaldehyde. More particularly, it relates to a process wherein aqueous formaldehyde is converted to polymer compositions that contain at least 82 percent of paraformaldehyde.

Paraformaldehyde is a mixture of polyoxymethylene glycols that contain about 8 to 100 formaldehyde units per molecule. It is ordinarily prepared by evaporating aqueous solutions of formaldehyde under vacuum to the point at which precipitation of the polymer occurs upon cooling. The average degree of polymerization of paraformaldehyde varies with the conditions employed for the preparation of the polymer. The production of paraformaldehyde having a very high degree of polymerization is generally undesirable because the utility of such materials is limited by their low solubility in water. Paraformaldehyde having a low degree of polymerization has a relatively low formaldehyde content and is quite soft and difficult to handle. In addition the low molecular weight products generally do not have satisfactory heat stability and stability on storage. A number of processes have been suggested for the production of paraformaldehyde having a controlled degree of polymerization, but none has proven to be entirely satisfactory. Some of these processes are difficult to control sufficiently to obtain a product having the desired molecular weight, chemical reactivity, and other properties, while others are not economical in that they are excessively time-consuming, require the use of materials, such as alkanols, which must later be recovered, or do not give a high yield of the desired product.

It has now been found that paraformaldehyde having a high formaldehyde content and a controlled average degree of polymerization can be prepared in an almost quantitative yield by a process wherein a deionized aqueous formaldehyde solution is flash-evaporated in a plurality of stages that are separated by and followed by polymerization periods. The polymerized concentrate obtained, which contains 82 percent to 88 percent of formaldehyde, is then cooled and solidified. The solid product may be further dried to raise its paraformaldehyde content to 90 percent to 95 percent. The process is preferably operated continuously using two evaporation steps and two polymerization steps.

The aqueous formaldehyde solution from which the paraformaldehyde is prepared may contain from 30 percent to 50 percent of formaldehyde and less than 1.5 percent of methanol. Because the water from which such solutions are prepared generally contains small amounts of inorganic alkaline and acidic contaminants that can accelerate the rate at which formaldehyde in concentrated aqueous solutions polymerizes, it is usually preferred that deionized formaldehyde solutions be used in the practice of this invention. Such solutions can be obtained by deionizing the water used in the manufacture of the formaldehyde solution or by contacting the formaldehyde solutions with anion-exchange and cation-exchange materials to reduce their mineral content to less than 50 p.p.m. Because small amounts of formic acid are formed as a product of the Cannizzaro reaction that takes place in formaldehyde solutions, the pH of the deionized formaldehyde solutions is usually in the range of 2.0 to 5.0 In most cases, the feed to the first evaporator is a deionized formaldehyde solution that contains 40 percent to 45 percent of formaldehyde, less than 1.5 percent of methanol, and less than 50 p.p.m. of inorganic materials and that has a pH in the range of 2.3 to 3.0. To improve the efficiency of the process, the solution may be heated to 50° C. to 70° C. before it is fed into the first evaporator.

In a preferred embodiment of this invention, the deionized formaldehyde solution is fed continuously into an evaporator which rapidly yields an overhead fraction or distillate, which is poorer in formaldehyde than the feed solution and which contains substantially all of the methanol and other volatile impurities present in the feed solution, and a bottom fraction or residue of higher formaldehyde concentration than the feed solution. This first flash evaporation is effected by passing the deionized formaldehyde solution continuously through an evaporator whose walls are maintained at a temperature in the range at 140° C. to 200° C. and which is maintained at an absolute pressure of 75 mm. to 150 mm. The average residence time of the formaldehyde solution in the evaporator is between 2 seconds and 120 seconds and preferably between 5 seconds and 20 seconds. The overhead fraction, which contains 5 percent to 10 percent of formaldehyde, may be condensed and then distilled to obtain a fraction of reduced methanol content which may be fed to the absorbers in a formaldehyde plant.

The bottom fraction, whch contains 60 percent to 75 percent of formaldehyde, is fed continuously into a polymerization vessel where it is maintained at 60° C. to 90° C. for a period of 30 minutes to 2 hours. At the end of this time, its viscosity is in the range of about 1 centipoise to 5 centipoises.

Following the first polymerization period, the concentrated solution is passed rapidly through an evaporator whose inner walls are maintained at 140° C. to 200° C. and which is maintained at an absolute pressure of 75 mm. to 150 mm. The average residence time of the formaldehyde solution in this evaporator is between 2 seconds and 120 seconds and preferably between 5 seconds and 20 seconds. The overhead fraction that is obtained, which is condensed to give an aqueous solution containing 10 percent to 40 percent of formaldehyde, may be recycled to the first evaporator.

The conditions under which the second evaporation step is carried out are those that will yield a bottom fraction that contains 82 percent to 88 percent of formaldehyde and formaldehyde oligomers, since this is maximum concentration that can be obtained continuously without loss of yield and without danger of plugging the equipment with a solidified high molecular weight product. The bottom fraction is further polymerized by heating it at a temperature between 100° C. and 140° C. at atmospheric pressure or superatmospheric pressure until its viscosity is greater than about 100 centipoises. This ordinarily requires a polymerization period of 1.5 hours to 4 hours. The resulting polymerized concentrate is then cooled and solidified to yield particles of any desired form. It may, for example, be flaked or prilled. The solidified product may be heated and dried to increase its paraformaldehyde content to about 90 percent to 95 percent.

Particularly advantageous results are obtained when the process is carried out under the following conditions: A deionized 45 percent formaldehyde solution at a pH of 2.3 to 3.0 is fed continuously into a thin-film evaporator whose jacketed walls are heated with steam at about 90 to 115 pounds per square inch pressure and that is maintained at an absolute pressure of 105 mm. to 120 mm. at such a rate that the average residence time in the evaporator is 5 seconds to 20 seconds. The overhead fraction is condensed, and the condensate is distilled in a packed column to yield a fraction richer in methanol than the condensate, which is discarded, and a fraction poorer in methanol than the condensate, which may be returned to the absorbers in the formaldehyde plant. The bottom fraction, which contains 65 percent to 70 percent of formaldehyde, is polymerized at 70° C. to 80° C. and an absolute pressure of 100 mm. to 120 mm. for 45 minutes to 90 minutes and then fed continuously into a thin-film evaporator whose jacketed walls are heated with steam at about 70 to 90 pounds per square inch pressure and that is maintained at an absolute pressure of 105 mm. to 120 mm. at such a rate that the average residence time in the evaporator is 5 seconds to 20 seconds. The concentrate obtained, which contains 82 percent to 88 percent of formaldehyde and formaldehyde oligomers, is further polymerized by holding it at 115° C. to 130° C. at a pressure of 1.1 to 2 atmospheres.

The polymerized concentrate is then continuously cooled and solidified. This is ordinarily done by flaking the polymerized concentrate on a drum flaker having provision for maintaining the liquid material at 110° C. to 115° C. and having its drum surface maintained at a temperature below about 20° C. An alternative process, which gives a less dense and less uniform product, involves spraying the concentrate into a chamber maintained at a temperature below 70° C. to form free-flowing microspheres.

The solid product may, if desired, be dried further in a circulating air dryer at 60° C. to 90° C. for 20 minutes to 60 minutes to increase its paraformaldehyde content to 90 percent to 95 percent. The resulting product generally has a bulk density of about 18 to 25 lbs./cu. ft. and a chemical reactivity (the percentage of paraformaldehyde that is dissolved in an aqueous pH 7.8 buffer solution at 25° C. in 40 minutes) of 70 percent to 80 percent.

The two evaporation steps of this process can be carried out in any apparatus in which the aqueous formaldehyde solution can be heated rapidly under reduced pressure to cause flash evaporation of water to occur and from which the concentrated solution can be quickly withdrawn. A suitable type of evaporator is the thin-film evaporator. In such an evaporator, of which numerous types are available commercially, the solution that is to be concentrated is fed continuously into a heated, partially-evacuated vessel in such a way that walls of the vessel are coated with a uniform, thin layer of the solution. This can be accomplished by careful control of the feed rate and by the presence in the vessel of rotor blades which spread the film evenly on the walls. As the solution flows down the heated walls of the vessel, water vapor which contains small amounts of formaldehyde, methanol, and gaseous impurities, is flash-evaporated from it. This vapor or overhead fraction is removed from the evaporator through a vapor outlet and condensed; the concentrated formaldehyde solution is discharged continuously from an outlet at the bottom of the evaporator into a polymerization vessel. The evaporator may be heated in any convenient way. For example, it may have a jacket into which steam at about 50 to 250 pounds per square inch of pressure is passed.

To obtain a high yield paraformaldehyde of high formaldehyde content and controlled molecular weight and chemical reactivity, the process must comprise two or more flash evaporation steps separated by and followed by polymerization steps. When other known techniques for the concentration of formaldehyde solutions, such as evaporation in a multi-stage evaporator or distillation under pressure, are used instead of flash evaporation, the concentration of the formaldehyde solution is more time-consuming and less efficient because the other techniques ordinarily yield overhead fractions that contain larger amounts of formaldehyde that must be recovered and recycled in order to obtain a satisfactory yield of paraformaldehyde. Thus less product is obtained per pound of feed and per hour and more and larger recycle handling equipment is required. In addition a flash evaporator may be readily cleaned because there is little build-up of polymer on its heat-transfer surface.

When the polymerization period after the first evaporation step is omitted, relatively little increase in the formaldehyde concentration of the solution takes place because under the conditions at which the flash-evaporation is carried out the formaldehyde in the solution vaporizes at approximately the same rate as water. This distillation of formaldehyde is minimized in accordance with this invention by polymerizing the formaldehyde to its less volatile oligomers prior to the second evaporation step. In the absence of a polymerization step after the second flash-evaporation, the product is a soft waxy material that is difficult to handle and that cannot be flaked.

The invention is further illustrated by the example that follows. In this example, all percentages are percentages by weight.

Example

A formaldehyde solution that contained 45 percent of formaldehyde, less than 1.5 percent of methanol, 72 p.p.m. of ash and 0.6 p.p.m. of iron was passed through a bed of a cation-exchange resin (Amberlite IR–45) and then through a bed of an anion-exchange resin (Amberlite IR–200). The effluent solution, which contained 17 p.p.m. of ash and 0.2 p.p.m. of iron and had a pH of 2.7, was heated to 60° C. and then fed continuously into a jacketed thin-film evaporator, which was heated by steam at 100 p.s.i. and which was maintained at an absolute pressure of 110 mm. During the introduction of the formaldehyde solution, rotor blades attached to a shaft extending vertically through the evaporator were rotated at 1200 r.p.m. to cause the solution to form a uniform thin film on the walls of the heating chamber as well as to remove any polymer that formed on the heated walls. After an average residence time of 5 to 10 seconds in the evaporator, the bottom fraction, which contained 69 percent of formaldehyde, was discharged continuously into a polymerization vessel where it was maintained at 75° C. at 110 mm. absolute pressure for an average period of 1 hour before being fed into the second evaporator.

The overhead fraction from the first evaporator was condensed and then distilled in a packed column at a reflux ratio of 12:1 to separate a fraction containing 14.6 percent of methanol and 6.5 percent of formaldehyde and a fraction containing 0.45 percent of methanol and 4.5 percent of formaldehyde. The former fraction which contained about 84 percent of the methanol and about 2 percent of the formaldehyde present in the feed solution was discarded; the latter fraction was fed to the absorbers in the formaldehyde plant.

Following the first polymerization period, the formaldehyde solution, which had a viscosity of 1.4 centipoises, was fed continuously into a second jacketed thin-film evaporator, which was heated by steam at 80 p.s.i. and which was maintained at 110 mm. absolute pressure. After an average residence time of 5 to 20 seconds in the evaporator, the bottom fraction, which contained 85 percent of formaldehyde and formaldehyde oligomers, was discharged continuously into a polymerization vessel which was maintained at 115° C. at 1.5 atmospheres pressure.

The overhead fraction, which contained 30 percent of formaldehyde, was condensed and recycled to the first evaporator.

After a polymerization period that averaged 1.5 hours during which time its viscosity increased from 7 centipoises to about 200 centipoises, the concentrate at 115° C. was fed continuously to a drum flaker, whose drum surface was maintained at 16° C. The resulting solidified product, which had been formed into small, relatively hard flakes, contained 87.4 percent of paraformaldehyde. After a two-hour drying period in a circulating air dryer at 80° C., the flaked product contained 91.06 percent of paraformaldehyde; it had a chemical reactivity of 74.18 percent and a bulk density of 20 pounds per cubic foot.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:
1. A process for the production of paraformaldehyde which comprises the following steps:
  (a) heating and concentrating an aqueous solution containing 30 percent to 50 percent of deionized formaldehyde and having a pH in the range of 2.0 to 5.0 at 140° C. to 200° C. at an absolute pressure between 75 mm. and 150 mm. for 2 seconds to 120 seconds, thereby forming a first vapor phase and a first liquid phase, said liquid phase being an aqueous solution containing 60 percent to 75 percent of formaldehyde, and separating said phases;
  (b) heating said liquid phase at 60° C. to 90° C. for 30 minutes to 120 minutes, thereby forming a polymerized first concentrate;
  (c) heating and concentrating said polymerized first concentrate at 140° C. to 200° C. at an absolute pressure between 75 mm. and 150 mm. for 2 seconds to 120 seconds thereby forming a second vapor phase and a second liquid phase, said liquid phase being an aqueous solution containing 82 percent to 88 percent of formaldehyde, and separating said phases;
  (d) heating said second liquid phase at 100° C. to 140° C. at a pressure between about 1 atmosphere and 5 atmospheres for 1.5 hours to 4 hours, thereby forming a polymerized second concentrate; and
  (e) cooling and solidifying said polymerized second concentrate to obtain paraformaldehyde.

2. The process according to claim 1 wherein in Step (a) a deionized aqueous solution containing 30 percent to 50 percent of formaldehyde and having a pH in the range of 2.3 to 3.0 is heated and concentrated at 160° C. to 170° C. at an absolute pressure of 105 mm. to 120 mm. for 5 seconds to 20 seconds, thereby forming a first vapor phase and a first liquid phase, said liquid phase being an aqueous solution containing 65 percent to 70 percent of formaldehyde.

3. The process according to claim 2 wherein said first vapor phase is deflegmated to yield a fraction which is poorer in methanol than the vapor phase and said fraction is recovered.

4. The process according to claim 1 wherein in Step (b) the formaldehyde solution is heated at 70° C. to 80° C. at an absolute pressure between 100 mm. and 120 mm. for 45 minutes to 90 minutes.

5. The process according to claim 1 wherein in Step (c) the polymerized first concentrate is heated and concentrated at 150° C. to 160° C. at an absolute pressure of 105 mm. to 120 mm. for 5 seconds to 20 seconds, thereby forming a second vapor phase and a second liquid phase, said second liquid phase being an aqueous solution containing 82 percent to 88 percent of formaldehyde.

6. The process according to claim 5 wherein said second vapor phase is condensed to form an aqueous solution containing 10 percent to 40 percent of formaldehyde and said solution is added to the feed solution used in Step (a) of the process.

7. The process according to claim 1 wherein in Step (d) the concentrated formaldehyde solution is heated at 115° C. to 130° C. at a pressure between 1.1 atmospheres and 2 atmospheres for 3 to 4 hours.

8. The process according to claim 1 wherein the polymerized second concentrate is cooled and solidified on a drum flaker having the drum surface at a temperature below 20° C.

9. The process according to claim 1 wherein the polymerized second concentrate is cooled and solidified by spraying it into a chamber a a temperature below 70° C.

10. The process according to claim 1 wherein the cooled and solidified product is heated at 60° C. to 90° C. to increase its paraformaldehyde content to 90 percent to 95 percent.

References Cited

UNITED STATES PATENTS

| | | |
|---|---|---|
| 2,568,017 | 9/1951 | MacLean et al. __ 260—615.5 XR |
| 2,581,881 | 1/1952 | Pyle et al. |
| 3,077,441 | 2/1963 | Kodama et al. __ 260—615.5 XR |

FOREIGN PATENTS

| | | |
|---|---|---|
| 1,360,134 | 3/1964 | France. |
| 814,119 | 5/1959 | Great Britain. |

LEON ZITVER, *Primary Examiner.*

HOWARD T. MARS, *Assistant Examiner.*